United States Patent [19]

Shajenko

[11] 4,422,167
[45] Dec. 20, 1983

[54] WIDE-AREA ACOUSTO-OPTIC HYDROPHONE

[75] Inventor: Peter Shajenko, Storrs, Conn.

[73] Assignee: The United States of America as represented by the Secretary of the Navy, Washington, D.C.

[21] Appl. No.: 277,297

[22] Filed: Jun. 25, 1981

[51] Int. Cl.³ .............................................. H04R 23/00
[52] U.S. Cl. .................................... 367/149; 367/153
[58] Field of Search ................. 350/358, 96.29, 96.21; 367/140, 141, 149, 154, 153, 157; 332/7.51; 330/4.3

[56] References Cited

U.S. PATENT DOCUMENTS

| | | | |
|---|---|---|---|
| 3,307,113 | 2/1967 | Hughes | 330/4.3 |
| 3,457,425 | 7/1969 | Preston, Jr. | 350/358 |
| 3,706,939 | 12/1972 | McLafferty | 330/4.3 |
| 3,903,496 | 6/1974 | Stimler | 340/8 R |
| 4,053,845 | 10/1977 | Gould | 330/4.3 |
| 4,081,216 | 3/1978 | Cook | 367/140 |
| 4,087,156 | 5/1978 | Kao et al. | 350/96.15 |
| 4,093,924 | 6/1978 | Farcy | 330/4.3 |
| 4,115,753 | 9/1978 | Shajenko | 367/154 |
| 4,156,852 | 5/1979 | Hagen | 330/4.3 |
| 4,188,096 | 2/1980 | Shajenko | 350/358 |
| 4,193,130 | 3/1980 | Young et al. | 367/149 |

OTHER PUBLICATIONS

Fiber-Optic Detection of Sound by Cole et al., J. Acoust. Soc. Am., vol. 62, No. 5, Nov. 1977.

Primary Examiner—Harold J. Tudor
Attorney, Agent, or Firm—Robert F. Beers; Arthur A. McGill; Michael J. McGowan

[57] ABSTRACT

A wide-area acousto-optic hydrophone which uses signal and reference laser beams together with interferometric methods for detecting underwater acoustic signals. The signal beam is distributed across the wide sensing area of the hydrophone using beam folding techniques while being directly transmitted through a sensing chamber filled with an optically transparent bulk material, the refractive index of which varies with the incident acoustic pressure thereby modulating the signal beam. Concurrently, a reference beam of equal length and folded in an identical pattern is directly passed through an adjacent chamber filled with the same bulk material. A microhole joins the two chambers, to expose the reference beam to the same static pressure and temperature fluctuations as the signal beam thus serving as a low pass filter. The modulated signal beam and the unmodulated reference beam are then combined and superimposed on the surface of a photodetector, the output of which is proportional to the phase shifts produced by the incident acoustic signals.

4 Claims, 3 Drawing Figures

WIDE-AREA ACOUSTO-OPTIC HYDROPHONE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a wide-area acousto-optic hydrophone used in acoustic arrays for sensing underwater acoustic signals and more particularly to an acousto-optic hydrophone wherein a signal laser beam and a reference laser beam are passed directly through adjacent filled with optically transparent material in such a fashion that each beam undergoes sequential reflections off a series of fixed, rigid mirrors arranged within each chamber in a pattern which folds each beam across a wide area within the bulk material, at the time the bulk material of the signal beam chamber is exposed, through a flexible membrane, to dynamic acoustic pressure variations from the incident signal while the reference beam chamber bulk material experiences only static environmental factors, e.g., temperature and pressure, but not the dynamic ones.

(2) Description of the Prior Art

Conventional sound sensing devices employ magnetostrictive or piezoelectric materials that, when subjected to variations in pressure from impinging acoustic pressure waves, generate electrical signals which are then processed using electronic devices. The use of such hydrophones in acoustic arrays however requires electronic circuitry to each of the hydrophones distributed along the array to provide power and telemetry for operation. Consequently, reductions in the size and weight of acoustic arrays using piezoelectric hydrophones has now reached a practical minimum. In addition, the operational reliability of an acoustic array depends upon the reliability of the electronic devices used to construct that array. What is desirable are hydrophones which do not require any associated electronics thus eliminating the need for electric power to drive such electronic devices, thereby improving the operation of the acoustic arrays.

Acousto-optic transduction is an emerging technology for sensing acoustic pressure by means of light beams. The advancement of fiber optic technology promises to eliminate the telemetry electronics usually associated with currently used piezoelectric hydrophones. Hydrophones constructed using optical sensing offer potentially siginificant improvements in sensitivity, versatility, directionality and reliability over conventional hydrophones. Furthermore, they offer freedom from electromagnetic interference, a reduction in array size, weight and cost together with broad design flexibility for reducing sensitivity to non-acoustic noise.

Optically operated hydrophones have recently been used for frequency modulation of a laser beam or beams exposed to acoustic pressure variations utilizing the doppler effect. These are described in my U.S. Pat. Nos. 4,115,753 and 4,188,096 and in my co-pending patent application; Ser. No. 103,826 filed Dec. 10, 1979. The above described doppler effect devices function based upon the velocity of the moving reflecting surfaces varying the beam path length proportional to the incident acoustic signals. What is desirable is to have an acousto-optic hydrophone which uses laser light to sense only dynamic pressure variations of the incident acoustic waves by offering a wide sensing area to the acoustic signal. The present invention fills this need by sensing incident acoustic signals based solely on bulk material density changes which directly affect the index of refraction of the bulk material and in turn modulates the signal laser beam in proportion thereto by changing the effective optical path length for the beam exposed to the incident acoustic signal.

A wide sensing area is less sensitive to non-acoustic noise such as flow-induced noise while the inherent ability to modify areal beam density permits modifications in hydrophone discrimination. The hydrophone can be operated using a single mode or a multimode optical fiber as a conductor of laser light to and from the hydrophone element.

SUMMARY OF THE INVENTION

An acoustic detector in accord with the teachings of the instant invention is a dual chamber, wide-area acousto-optic hydrophone which uses both a signal and a reference laser beam together with interferometric methods for detecting underwater acoustic signals during underwater communication or surveillance. The signal beam is distributed across the hydrophone sensing chamber area using beam folding techniques while passing directly through the chamber's optically transparent bulk material, the refractive index of which varies in proportion to the pressure fluctuations of incident acoustic signals thereby modulating the signal laser beam. Concurrently, a reference beam of equal length and folded over an identical pattern is passed through an adjacent chamber filled with the same bulk material. A microhole joins the two chambers, thus exposing the reference beam to the same static pressure and temperature variations experienced by the signal beam thus serving as a low pass filter. The modulated signal beam and the unmodulated reference beam are then superimposed on the surface of a photodetector, the output of which is proportional to the phase shifts produced by the incident acoustic signals.

An object of subject invention is to provide an acoustic hydrophone of simple, rigid construction which has a extended sensing area for high sensitivity and is highly reliable.

Another object of subject invention is to provide a wide-area hydrophone wherein two laser beams passing directly through a bulk material are exposed to the same environmental conditions but only one of them experiences the acoustic pressure variations due to the incident underwater acoustic signal.

Still another object of subject invention is to provide an acousto-optic hydrophone which uses optical fibers to simplify data transmission to and from the hydrophone element thereby reducing telemetry equipment size and weight.

A further object of subject invention is to provide an acousto-optic hydrophone which, by varying the sensitivity across the surface area, can be used as an acoustic filter to reduce the effects of non-acoustic noise such as flow noise while at the same time permitting design of directional hydrophones.

Other objects, advantages and novel features of the invention will become apparent from the following detailed description when considered in conjunction with the accompanying drawings.

DESCRIPTION OF THE PREFERRED EMBODIMENT

Figure 1:
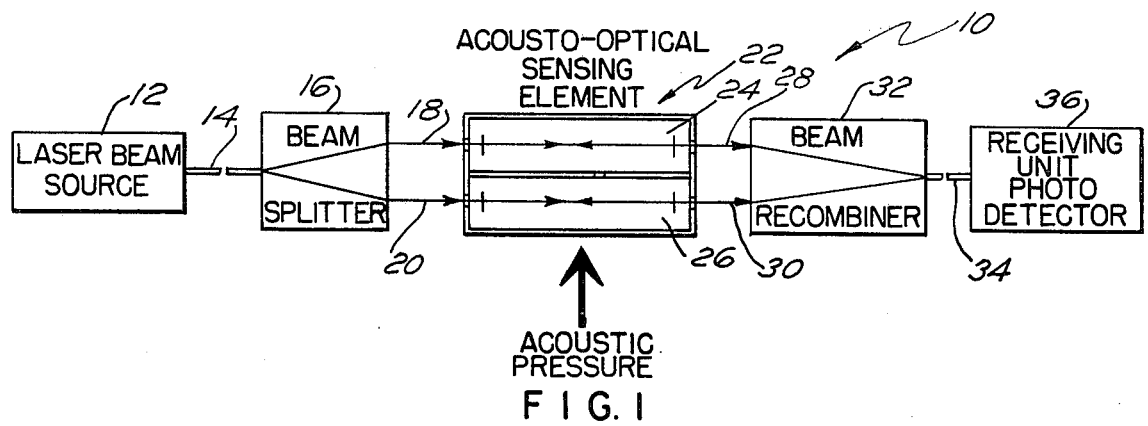
FIG. 1 shows a block diagram of an acousto-optic system built in accordance with the teachings of subject invention.

Whenever a light beam is passed through an optically transparent medium, its optical path length is varied when that medium is exposed to acoustic pressure. The variation in path length results in phase modulation of the beam, i.e., the phase is shifted in proportion to the applied acoustic pressure. Acoustic signals imposed on a light beam can be recovered by optical interferometry, which makes a phase comparison between a modulated and a unmodulated light beam (called signal and reference beams, respectively) in such a way that any phase shift is detected. Both beams are simultaneously superimposed on the surface of a photodetector; the resulting signal current is proportional to the varying differences between their phases. Each beam should be a train of light waves with well defined phases such as are generated by a stable, single mode laser and, ideally, the phase relationship between the beams should be unaffected by varying environmental conditions in order to minimize system noise. Most modulation techniques known in communication technology can be used for light modulation; however, the modulation index at acoustical pressures is so small that only intensity modulation and phase modulation are presently considered useful for underwater sound detection.

In considering intensity modulation of light it should be noted that the particle displacement in seawater at an acoustic pressure of 50 dB/$\mu$Pa (which corresponds to "sea state zero" at a frequency of 1,000Hz) is on the order of $10^{-4}$ Å (Angstroms), i.e., a small fraction of the atomic size. Since an optical hydrophone must be capable of detecting even lower pressures in order to compete with a conventional hydrophone, the difficulties involved in devising an optical hydrophone with intensity modulation is quite apparent.

Phase modulation is currently the most promising and most advanced of the two modulation techniques. The art of phase modulating light to detect small motions has been in use for a long time. It has advanced from gross visual observation of a fringe shift on a screen to using modern opto-electronics to measure displacements down to $10^{-15}$ meters. In an optical hydrophone, the modulation of a laser beam by acoustic pressure can be described in terms of the elasto-optical properties of the isotropic material through which the laser beam propagates. The optical path length of the laser beam in a material is varied by acoustic pressure induced changes in the material's index of refraction n and in the length of material L. The phase shift ($\Delta\phi$) of the laser beam produced by the acoustic pressure p is given by $$\Delta\phi = \frac{2\pi}{\lambda}\left(\frac{1}{3}K - n^{-1}\frac{dn}{dp}\right)nLp \quad (1)$$

where $\lambda$ is the wavelength of the laser light, and K is the compressibility of the material. It should be observed that the length of a bulk material decreases but the index of refraction increases with an increase in pressure.

Small phase variations of a laser beam are detected in an interferometer by means of modulated and unmodulated laser beams superimposed on the surface of a photodetector. At acoustic pressures, assuming that the signal and reference beams are of equal power, the signal current ($i_s$) of a photodetector is given by $$i_s = \beta\alpha P_o\Delta\phi, \quad (2)$$

where $\beta$ is the interferometeric efficiency, $\alpha$ is the radiant sensitivity of the photodetector in amperes/watt, and $P_o$ is the optical power on a photodetector.

The voltage sensitivity (S) and the noise equivalent pressure level ($SPL_{ne}$) of an optical hydrophone are then derived using equations (1) and (2). The voltage sensitivity is given by $$S = \frac{2\pi}{\lambda}\beta\alpha P_o R\left(\frac{1}{3}K - n^{-1}\frac{dn}{dp}\right)nL, \quad (3)$$

where R is the load resistance of the photodetector. The noise equivalent pressure level is given by $$SPL_{ne} = 20\log\left[\frac{\lambda}{\sqrt{2\pi\beta}}\left(\frac{eB}{\alpha P_o}\right)^{\frac{1}{2}}\frac{1}{\left(\frac{K}{3} - n^{-1}\frac{dn}{dp}\right)nL}\right], \quad (4)$$

where, e ($=1.6\times10^{-19}$ coulombs) is the electronic charge and B is the detector bandwidth. Equations (1) through (4) may be used to design an acousto-optical sensing element. A sensing element is that part of an acousto-optical interferometer system that senses the changes in acoustic pressure via the variation of the optical path length of the laser beam. Since the optical path length is a product of the index of refraction and the length of the material through which the laser beam propagates (called the interaction length) and since the sensing element may be of various designs, the resultant phase shift of the laser beam may be due to different combinations of the two varying quantities. All sensing elements however, are governed basically by the relations given in Eqs. (1) through (4).

The instant invention, by fixing the interaction length using rigidly mounted optical reflectors, provides a device which responds solely to dynamic pressure induced changes in the index of refraction of the bulk material medium in one chamber of a two-chamber hydrophone. Static pressure and temperature changes are experienced simultaneously in both chambers and the modulating effects thereof cancel each other out.

Referring now to the drawings, FIG. 1 shows a system, 10, using a wide area, acousto-optical hydrophone. System 10 includes a laser beam source 12 which directs a coherent source beam 14 along an optical fiber to beam splitter 16. Beam 14 is emitted from the fiber and is divided by beam splitter 16 into reference beam 18 and signal beam 20. Beams 18 and 20 next enter sensing element 22, passing through separate, bulk material filled chambers 24 and 26 respectively where they are folded using multireflection techniques into a pattern covering a wide area. The reference beam pattern length must be the same as the signal beam pattern length. Signal beam 20 is exposed to incident acoustic signal pressure, becoming phase modulated, while reference beam 18 sees no dynamic pressure variations and is not so modulated. The beams 18 and 20 emerge as unmodulated reference beam 28 and modulated signal beam 30. Beams 28 and 30 are joined in beam recombiner 32 producing composite beam 34 within an optical fiber which beam is in turn directed upon the receiving surface of photodetector unit 36. Demodulation is then performed on the output signal of photodetector 36 using the technique of interferometry to extract the phase shift produced by the acoustic signal.

Figure 2:
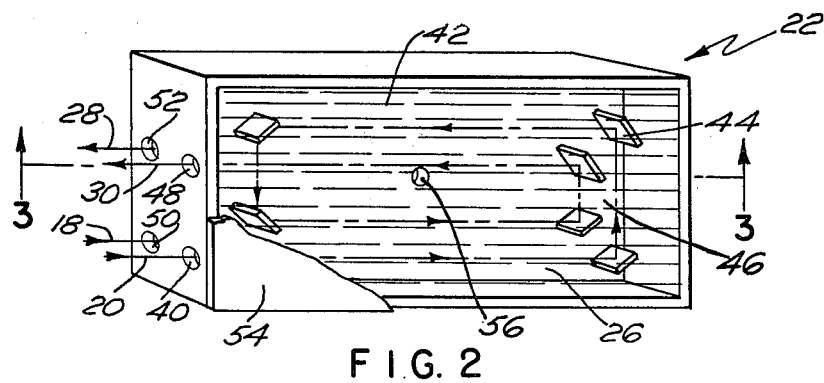
FIG. 2 shows a top view of the acousto-optic hydrophone sensing element of subject invention.

FIG. 2 discloses one embodiment of the hydrophone of subject invention. Here, a signal laser beam 20 enters chamber 26 through transparent window 40 and is folded across the chamber in such way as to cover a wide area. Chamber 26 is filled with an optically transparent bulk material 42, such as a silicone oil, or a silicone rubber whose index of refraction changes with pressure fluctuations. Folding of beam 20 is accomplished by rigidly attaching a plurality of optical reflectors 44 to wall 46 which divides the hydrophone into two chambers. Reflectors are spaced and located in such a way as to provide desired sensitivity and directivity to the hydrophone. Input beam 20 undergoes phase modulation while passing directly through the bulk material filling signal chamber 26 of hydrophone 22 which is exposed to the incident acoustic signal, and emerges through transparent window 48 as modulated signal beam 30.

Figure 3:
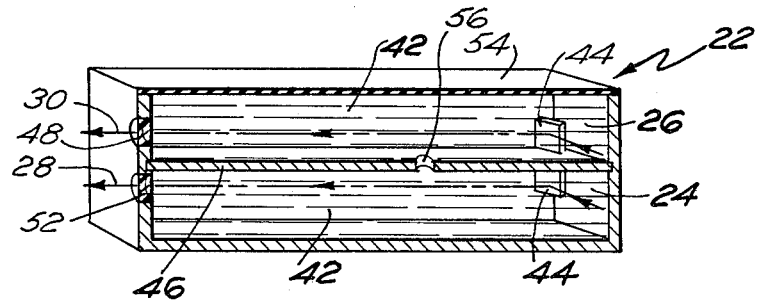
FIG. 3. is a sectional view taken along line 3—3 of FIG. 2.

FIG. 3, a sectional view of the hydrophone of FIG. 2, depicts the dual chamber construction referred to supra. More specifically, FIG. 3 shows input laser beams 28 and 30 exiting chambers 24 and 26 through transparent windows 48 and 52 respectively. Each beam has passed directly through bulk material 42 which fills each chamber, while reflecting off of a plurality of optical reflectors 44 rigidly mounted to dividing wall 46. One side of chamber 26 is exposed to the incident signal and is covered by flexible membrane 54, of material such as neoprene rubber, which allows pressure perturbations in the surrounding seawater to be transmitted to bulk material 42 in chamber 26 thereby changing the index of refraction of this bulk material in direct proportion to the externally applied pressure variations. Chambers 24 and 26 are connected by microhole 56 which acts as a low pass filter for acoustic pressure variations. In this way static pressure and temperature is equalized between the two chambers while dynamic pressure fluctuations affect only the index of refraction of the bulk material in exposed chamber 26.

What has thus been described is a wide-area acousto-optic hydrophone which uses signal and reference laser beams to detect underwater acoustic signals during underwater communication or surveillance. The signal beam is distributed across the wide hydrophone sensing chamber area using beam folding techniques while passing directly through the chamber's optically transparent bulk material, the refractive index of which varies in proportion to the pressure fluctuations of incident acoustic signals, thereby modulating the signal laser beam. Concurrently, the reference beam of equal length and folded in an identical pattern is passed through an adjacent chamber filled with the same bulk material. A microhole joins the two chambers, exposing the reference laser beam to the same static pressure and temperature variations experienced by the signal laser beam thus serving as a low pass filter. The modulated signal beam and the unmodulated reference beam are then superimposed, using interferometric methods, on the surface of a photodetector, the output of which is proportional to the phase shifts produced by the incident acoustic signals. Depending upon the desired application, there are many alternative configurations possible. The signal laser beam can be used directly, or can be guided along optical fibers to the sensing element. The density of signal laser beam per unit area of sensing surface may be varied in such a way that it will have spacial sensitivity. The sensing area may also be subdivided into a number of areas, each with a fluid of different index of refraction, therefore, further increasing areal sensitivity. Also, the reference beam can be maintained within an optical fiber.

The sensing area may be a flat surface or any other shape and the push-pull principle of the optical hydrophone can be applied.

With reference to the foregoing description, it is to be understood that what has been disclosed herein represents only a few embodiments of the invention and is to be construed as illustrative rather than restrictive in nature and that the invention is best described by the following claims.

What is claimed is:

1. An acousto-optic hydrophone system for sensing impinging acoustic pressure waves, said hydrophone system comprising:

laser beam generating means for providing a source laser beam;

beam splitting means for receiving said source beam and producing a signal beam and a reference beam therefrom;

hydrophone means, having an optically transparent bulk material sensing medium filling all voids over a wide area therein, for receiving said signal beam and said reference beam from said beam splitting means and directly distributing said signal beam and said reference beam in separate, fixed equal path length wide area patterns throughout said bulk material in such a way as to modulate said signal beam in proportion to dynamic pressure variations of said impinging acoustic waves while said reference beam is not so modulated, said modulation resulting solely from changes in the index of refraction of said bulk material proportional to said dynamic pressure variations, said hydrophone means further comprising a dual chambered box, the interior of which is separable into a first chamber and a second chamber, said first chamber having one side thereof open, a rigid dividing wall mounted within said dual chambered box essentially parallel to said open side for separating the internal volume of said box into said first chamber and said second chamber, a plurality of optical reflector pairs, one each reflector of said reflector pair being rigidly mounted to opposite sides of said dividing wall at each preselected location, said plurality of pairs being arranged in such equal path length patterns as to fold said signal beam and said reference beam over a relatively wide area of each of said first and second chambers using multi-reflection off said optical reflectors, a microhole through said dividing wall, said microhole connecting said first chamber and said second chamber together, a plurality of optically transparent input windows mounted in an external wall common to said first chamber and said second chamber through which said signal beam and said reference beam may pass, a plurality of optically transparent output windows mounted in said common external wall out through which said modulated signal beam and said unmodulated reference beam may pass, optically transparent bulk material of suitable compressibility through which said signal beam and said reference beam is made to directly pass, said bulk material filling remaining voids in said first chamber, said second chamber and said microhole, a flexible membrane, covering and fixedly attached to said open side of said first chamber, for transmitting said impinging acoustic pressure waves into said bulk material within said first chamber thereby varying the index of refraction thereof while said microhole filters said impinging acoustic pressure waves out of said second chamber;

beam recombining means for receiving said modulated signal beam and said unmodulated reference beam from said hydrophone means and focusing said modulated signal beam and said unmodulated reference beam in such a way as to form a single recombined modulated beam; and laser beam receiving means for receiving and converting said single recombined modulated beam into an electrical signal proportional to said impinging acoustic pressure waves.

2. The acousto-optic hydrophone system of claim 1 wherein said flexible membrane material is a neoprene rubber.

3. The acousto-optic hydrophone system of claim 2 wherein said optically transparent bulk material is a silicone oil.

4. The acousto-optic hydrophone system of claim 2 wherein said optically transparent bulk material is a silicone rubber.

* * * * *